(12) United States Patent
Zoka (10) Patent No.: US 6,591,249 B2
(45) Date of Patent: Jul. 8, 2003

(54) TOUCH SCAN INTERNET CREDIT CARD VERIFICATION PURCHASE PROCESS

(76) Inventor: Ron Zoka, 2170 Century Park East #1202, Los Angeles, CA (US) 90067

( * ) Notice: Subject to any disclaimer, the term of this patent is extended or adjusted under 35 U.S.C. 154(b) by 0 days.

(21) Appl. No.: 09/536,010

(22) Filed: Mar. 26, 2000

(65) Prior Publication Data

US 2002/0062291 A1 May 23, 2002

(51) Int. Cl.[7] .............................................. G06F 17/60
(52) U.S. Cl. ......................................... 705/18; 235/382
(58) Field of Search ................................ 235/382, 380; 713/186; 705/44, 38, 78, 53, 18

(56) References Cited

U.S. PATENT DOCUMENTS

| | | | |
|---|---|---|---|
| 5,224,173 A | | 6/1993 | Kuhns |
| 5,386,104 A | | 1/1995 | Sime ........................... 235/379 |
| 5,748,765 A | * | 5/1998 | Takhar ......................... 382/124 |
| 5,787,186 A | | 7/1998 | Schroeder |
| 5,802,199 A | * | 9/1998 | Pare, Jr. et al. .............. 382/115 |
| 5,818,955 A | * | 10/1998 | Smithies et al. ............. 382/115 |
| 5,867,665 A | * | 2/1999 | Butman et al. ........ 395/200.68 |
| 5,869,822 A | | 2/1999 | Meadows, II et al. |
| 5,870,723 A | | 2/1999 | Pare, Jr. et al. |
| 5,892,824 A | | 4/1999 | Beatson et al. ......... 382/119 X |
| 5,930,804 A | | 7/1999 | Yu et al. |
| 5,933,515 A | | 8/1999 | Pu et al. |
| 6,014,645 A | * | 1/2000 | Cunningham ................. 705/38 |
| 6,052,788 A | * | 4/2000 | Wesinger, Jr. et al. ....... 713/201 |
| 6,243,689 B1 | * | 6/2001 | Norton ......................... 705/18 |
| 6,453,301 B1 | * | 9/2002 | Niwa ........................... 705/26 |

FOREIGN PATENT DOCUMENTS

GB       2256170 A    *   2/1992

OTHER PUBLICATIONS

Anonymous, "Fingers Do The Walking At Purdue Banking Kiosks", Bank Network News, V16, No. 10 p. 2, Oct. 1997.*

* cited by examiner

Primary Examiner—F. J. Bartuska
(74) Attorney, Agent, or Firm—Michael I Kroll (57) ABSTRACT

A method and device for providing willing participants, having credit card worthiness, with a credit card which uses subscribers supplied biometric information as the preferred means for verifying the identity of the credit card user during credit card purchase transactions with those vendors/online merchants displaying the Touch Scan Logo on their websites and/or retail outlets. Additionally, user can register pre-existing credit/debit card(s) with the credit/debit card purchases identification verification system.

5 Claims, 9 Drawing Sheets

TOUCH SCAN INTERNET CREDIT CARD VERIFICATION PURCHASE PROCESS

BACKGROUND OF THE INVENTION

1. Field of the Invention

The present invention relates generally to biometric identification systems and, more specifically, to a method and device for providing willing participants, having credit card worthiness, with a credit card which uses subscribers supplied biometric information as the preferred means for verifying the identity of the credit card user during credit card purchase transactions with those vendors/online merchants displaying the Touch Scan Logo on their websites and/or retail outlets.

Touch Scan or an affiliated organization will accept credit card applications from interested parties. Touch Scan or its affiliates will verify credit worthiness. Upon issuance and acceptance of the credit card terms and conditions the credit card user will submit through secure channels personal biometric information which will be stored by Touch Scan along with other relevant credit card information, such as card number. During credit card purchases, the credit card user will submit the credit card number and biometric data procured during the purchase transaction which will be compared to stored biometric data to authenticate the credit card user as the authorized user of said issued credit card.

In addition, the present invention will offer to all interested parties a credit/debit card purchases identification verification system for pre-existing credit/debit cards. Willing participants will submit biometric information to Touch Scan whereby said biometric data will be used, in similar fashion as aforementioned, as identification verification during credit/debit card purchases.

Furthermore, the present invention will offer to willing credit card companies and banks a biometric verification service for their clients whereby their clients can submit biometric information to Touch Scan and their selective account(s) will be flagged for biometric sampling to complete credit/debit card transactions.

2. Description of the Prior Art

There are other credit/debit card systems designed for identification purposes. Typical of these is U.S. Pat. No. 5,224,173 issued to Kuhns et al. on Jun. 29, 1973.

Another patent was issued to Sime on Jan. 31, 1995 as U.S. Pat. No. 5,386,104. Yet another U.S. Pat. No. 5,787,186 was issued to Schroeder on Jul. 28, 1998 and still yet another was issued on Feb. 9, 1999 to Meadows II, et al. as U.S. Pat. No. 5,869,822.

Another patent was issued to Pare Jr., et al. on Feb. 9, 1999 as U.S. Pat. No. 5,870,723. Yet another U.S. Pat. No. 5,892,824 was issued to Beatson et al. on Apr. 6, 1999. Another was issued to Yu et al. on Jul. 27, 1999 as U.S. Pat. No. 5,930,804 and still yet another was issued on Aug. 3, 1999 to Pu et al. as U.S. Pat. No. 5,933,515.

U.S. Pat. No. 5,224,173

Inventor: Roger J. Kuhns et al.

Issued: Jun. 29, 1993

A current applicant for a government benefit presents a fingerprint signature to a large data bank to determine if his signature is already in the data bank, to thus indicate fraud. His fingerprint is rapidly machine correlated with the fingerprints of prior approved applicants and a number of close matches are thereafter visually examined by a human operator to definitively determine whether the current applicant's fingerprint is already in the data bank. However, a coarse biometric index (CBI) of the current applicant is first compared with all CBIs of approved applicants and only a tiny percentage of positive CBI matches result in the correlation of fingerprints and visual examination by the human operator, thereby to save huge amounts of human matching time and cost. The result is reliable and economical scanning of huge data banks such as the Social Security data base. The CBI can display facial images and eliminate fingerprints altogether if desired.

U.S. Pat. No. 5,386,104

Inventor: Iain R. F. Sime

Issued: Jan. 31, 1995

A self-service automated teller system includes a fraud detection module which uses a biometric recognition technique, such as voice or fingerprint recognition, in combination with predictive technology. The biometric recognition test is normally decisive, but if this test produces a result which is close to a predetermined threshold, the predictive technology checks to determine whether the transaction is consistent with the user's normal behavior before permitting the transaction to proceed. A suspicion count may also be included in the decision-making process, to determine whether or not the user has a previous record of suspicious transactions.

U.S. Pat. No. 5,787,186

Inventor: Carlos Cobian Schroeder

Issued: Jul. 28, 1998

A biometric security procedure for manufacturing an identity document, such as an identity card, credit card, visa or passport, which includes the steps of: providing a nucleus of the identity document, the nucleus including personal data of a holder of the identity document and a face image of the holder; carrying out, by a computer and an image capturer such as a scanner or a video camera, an analysis of face features of the face image, the computer carrying out an analysis of basic face features of the face image, comparing the basic face features with master/pattern features in a data base, wherein each master/pattern feature has a specific number; obtaining by the analysis a derived set of master/pattern features that corresponds to a characteristic synthetic image of the holder, the derived set of master/pattern features corresponding to a specific numeric code determined by the number of each of the master/pattern features making up the derived set of master/pattern features; and printing the specific numeric code by a printer connected to the computer, on an area of the identity document defined as a code window, whereby the specific numeric code univocally characterizes the holder of the identity document.

U.S. Pat. No. 5,869,822

Inventor: Dexter L. Meadows II, et al.

Issued: Feb. 9, 1999

An automated fingerprint identification system (10), which utilizes an encoded identification card, such as a credit card (12). When a person applies for a credit card (12)

they must register a finger of their choice with the card issuance company. At the company, the finger is scanned and a composite number (14) is produced that consists of several fingerprint identifying parameters. The composite number (14), corresponding to the fingerprint is encoded onto the card (12) and is also stored in a card database (50) and/or a server database (52). When a person wants to use the card (12), the card (12) is inserted into a card reader (22) and the person's finger is scanned by a fingerprint scanner (24) which produces a composite number (14) that is compared with the composite number (14) in the card or server database (50, 52). If the two composite numbers (14) are similar, use of the card is allowed. Conversely, if they are not similar, use of the card is disallowed.

U.S. Pat. No. 5,870,723

Inventor: David Ferrin Pare Jr., et al.

Issued: Feb. 9, 1999

A method and system for tokenless authorization of commercial transactions between a buyer and a seller using a computer system. A transaction is proposed by a seller, and the buyer signals his acceptance by entering his personal authentication information comprising a PIN and at least one biometric sample, forming a commercial transaction message. The commercial transaction message is forwarded to the computer system, where the computer system compares the personal authentication information in the commercial transaction message with previously registered buyer biometric samples. If the computer system successfully identifies the buyer, a financial account of the buyer is debited and a financial account of the seller is credited, and the results of the transaction are presented to both buyer and seller. As a result of the invention, a buyer can conduct commercial transactions without having to use any tokens such as portable man-made memory devices such as smartcards or swipe cards. The invention allows buyers to quickly select one of a group of different financial accounts from which to transfer funds. The invention further indicates to the user that the authentic computer system was accessed by the use of a private code that is returned to the buyer after the identification is complete. The invention additionally permits an authorized buyer to alert authorities in the event of an emergency, such as when a transaction is coerced.

U.S. Pat. No. 5,892,824

Inventor: Rodney Beatson et al.

Issued: Apr. 6, 1999

A signature device for capture or capture and verification includes a variety of advantageous features including, for example, an ability to work in conjunction with an IC card; an improved angle correction technique; an improved technique for adapting to biometric signature changes; and many other new improvements.

U.S. Pat. No. 5,930,804

Inventor: Yuan-Pin Yu et al.

Issued: Jul. 27, 1999

A Web-based authentication system and method, the system comprising at least one Web client station, at least one Web server station and an authentication center. The Web client station is linked to a Web cloud, and provides selected biometric data of an individual who is using the Web client station. The Web server station is also linked to the Web cloud. The authentication center is linked to at least one of the Web client and Web server stations so as to receive the biometric data. The authentication center, having records of one or more enrolled individuals, provides for comparison of the provided data with selected records. The method comprises the steps of (I) establishing parameters associated with selected biometric characteristics to be used in authentication; (ii) acquiring, at the Web client station, biometric data in accordance with the parameters; (iii) receiving, at an authentication center, a message that includes biometric data; (iv) selecting, at the authentication center, one or more records from among records associated with one or more enrolled individuals; and (v) comparing the received data with selected records. The comparisons of the system and method are to determine whether the so-compared live data sufficiently matches the selected records so as to authenticate the individual seeking access of the Web server station, which access is typically to information, services and other resources provided by one or more application servers associated with the Web server station.

U.S. Pat. No. 5,933,515

Inventor: Allen Pu et al.

Issued: Aug. 3, 1999

An identification system using biometric information of human body parts and a secret sequence code. In particular, biometric information of human body parts is used to form the secret sequence code. Specifically, a combination entry device recognizes user's fingerprints which are entered as a sequence. The fingerprints must be entered in the proper sequence in order to be recognized by the system. The fingerprints are preferably recognized using a fast technique with a low-probability level of rejection. While the sensor can be fooled for any one fingerprint. The use of a plurality of different fingerprints improves the identification capability. In particular, the combination of fingerprints in the proper order is necessary to undo the lock.

While these credit/debit card identification systems may be suitable for the purposes for which they were designed, they would not be as suitable for the purposes of the present invention, as hereinafter described.

SUMMARY OF THE PRESENT INVENTION

The invention is a method whereby consumers can utilize the services and biometric equipment of Touch Scan and/or its affiliates to perform conclusive identification of the credit card user during credit card purchases with participating vendors subscribing to Touch Scan services, using biometric data supplied to Touch Scan during the registration process with biometric data procured during credit card transactions.

The biometric data involves measurement of an individual's unique physical traits for the purposes of providing more conclusive identification of the individual by comparing real time purchase transaction biometric data with stored biometric data associated with a selected credit/debit card.

The biometric data can be comprised of fingerprint scanning, and/or signature recognition and/or facial recognition.

Fingerprint scanning requires fingerprint scanners and supporting software that analyzes the fingerprint image endings or bifurcations, branches made by ridges.

Signature recognition requires a digital input tablet, electronic pen and supporting software that analyzes the characteristics of the signature.

Facial recognition requires the use of a PC camera and supporting software which can capture and analyze facial features, patterns and unique shape.

Touch Scan, operating as a credit institution or in partnership with an existing credit institution, will verify credit worthiness. Whereupon, the applicant will be furnished with biometric hardware, if needed, and a credit card. The biometric hardware will be interfaced by the applicant with the applicants Internet accessing system.

After installation of the biometric add-on device, the applicant will establish a secure connection (PKI, SSL, VPN) with Touch Scan. The applicant, will scan their fingerprints utilizing the biometric add-on device, and transmit their fingerprints to Touch Scan database for storage and future reference.

Participating vendors will contract with Touch Scan utilizing Touch Scan as a verification/authorization service bureau for verifying the identity of participating users credit card purchases, using the participating user's stored fingerprints for comparison to the fingerprint data submitted during the purchasing transaction.

In addition, Touch Scan will provide biometric hardware and software to those individuals who wish only to use Touch Scan's services for existing credit cards.

While using their credit card(s) for purchases, consumers will place one or more digits/fingers on the biometric hardware which will scan the prints and submit the prints via secure connection to Touch Scan for identity verification. This process may occur at a retail store or through the Internet.

A primary object of the present invention is to provide an identification system that will overcome the shortcomings of prior art devices.

Another object of the present invention is to provide credit/debit card users with means for biometric identification verification.

Yet another object of the present invention is to provide credit/debit card users with means for submitting personal biometric information for computer storage.

Still yet another object of the present invention is to provide credit/debit card users with a computer accessible storage facility maintaining personal biometric information.

A further object of the present invention is to provide credit/debit card users with a computer accessible storage facility maintaining personal credit/debit card information.

A yet further object of the present invention is to provide willing participants with a computer accessible storage facility whereby at least one credit/debit card account number is associated with at least one personal biometric sample.

A still further object of the present invention is to provide credit/debit card users with a computer accessible storage facility for maintaining personal biometric information that can be accessed by participating vendors/online merchants to verify the identity of credit/debit card users.

An even further object of the present invention is to provide vendors/online merchants with a computer accessible storage facility that can be accessed using biometric information and credit/debit account number to verify the identity of registered credit/debit card users at time of purchase.

Another object of the present invention is to provide a credit card having submission of biometric information as part of the application process.

Yet another object of the present invention is to provide participating users without a biometric device with a biometric device whereby said users can electronically submit biometric information during credit/debit card purchases.

Still yet another object of the present invention is to provide registered credit/debit card users with means for completing credit/debit card transactions with participating vendors/online merchants by submitting verifiable personal biometric information.

A further object of the present invention is to provide credit card companies with a service bureau whereby their credit card holders can submit biometric information which can be accessed by participating vendors during credit card purchases for credit card bearer identification.

A yet further object of the present invention is to provide banks with a service bureau whereby their debit card holders can submit biometric information which can be accessed by the bank or participating vendors during debit card purchases for debit card bearer identification.

A still further object of the present invention is to provide participating e-commerce vendors with a level of security whereby said vendors can be assured that users submitting credit card information during credit card purchases is the authorized card holder by verifying submitted biometric information.

An even further object of the present invention is to provide participating e-commerce credit/debit card holders with a level of security that by submitting credit/debit card numbers during credit/debit card purchases that said numbers can not be fraudulent acquired for additional purchases with participating e-business sites.

Additional objects of the present invention will appear as the description proceeds.

The present invention overcomes the shortcomings of the prior art by providing a credit/debit card verification system whereby one or more centralized databases will maintain, at the credit card holders request, a copy of the cardholders fingerprints which will be used as the definitive means for verifying the acceptable identity of the credit or debit card holder during a credit or debit card purchase transaction with those vendors displaying the Touch Scan logo.

In addition the present invention will offer to all interest parties having credit worthiness a credit card either through Touch Scan or an affiliated organization whereby the card holder will submit personal biometric information which will be linked to the credit card whereby said users will be able to submit comparable biometric information at the time of credit card purchases with participating vendors whereby said vendors will be able to electronically verify that the card user is authorized.

Further the present invention will offer to willing credit card companies and banks a biometric verification service whereby their clients can submit biometric information for storage and future comparison during card transactions.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

List of Reference Numerals Utilized in the Drawings 10 biometric credit/debit card verification system
12 user
14 user fingerprint
16 biometric scanning device
18 Internet e-commerce
20 user Internet equipment
22 Touch Scan logo
24 on-line vendor/merchant
26 available credit service provider
30 Touch Scan server/database
32 credit card provider
34 internet
38 router/firewall
40 DNS server
42 router
44 DMZ/firewall
46 modem
48 secure connection (PKI/iVPN) encryption
50 secure connection (http/SS1/PKI) encryption
52 biometric finger
54 biometric credit card application
56 credit information
58 encrypted credit application
60 transmit encrypted credit application
62 credit provider process application
64 credit provider approval indicator
66 application rejected
68 application approved—credit card issued
70 biometric device availability indicator
72 biometric device provided
74 user fingerprints scanned
76 encrypted fingerprint data
78 transmit encrypted fingerprint data
80 encrypted fingerprint data stored on Touch Scan database
82 biometric credit card purchase services available
84 biometric services application
86 credit card information
88 encrypted credit card information
90 transmit encrypted credit card information to Touch Scan database
92 secure biometric credit card purchase services available for existing credit card(s)
94 purchase transaction
96 enter credit/debit card number
98 fingerprint(s) scanned
100 database query encrypted
102 fingerprint database query transmitted
104 fingerprint database software processes query
106 fingerprint database software returns query indicator
108 fingerprint database software returns no match—rejected
110 fingerprint database software returns match—approved
112 fingerprint database query status transmitted

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

Turning now descriptively to the drawings in which similar reference characters denote similar elements throughout the drawing figures. FIG. 1 through FIG. 9 illustrate the biometric credit card system of the present invention indicated generally by the numeral 10.

Figure 1:
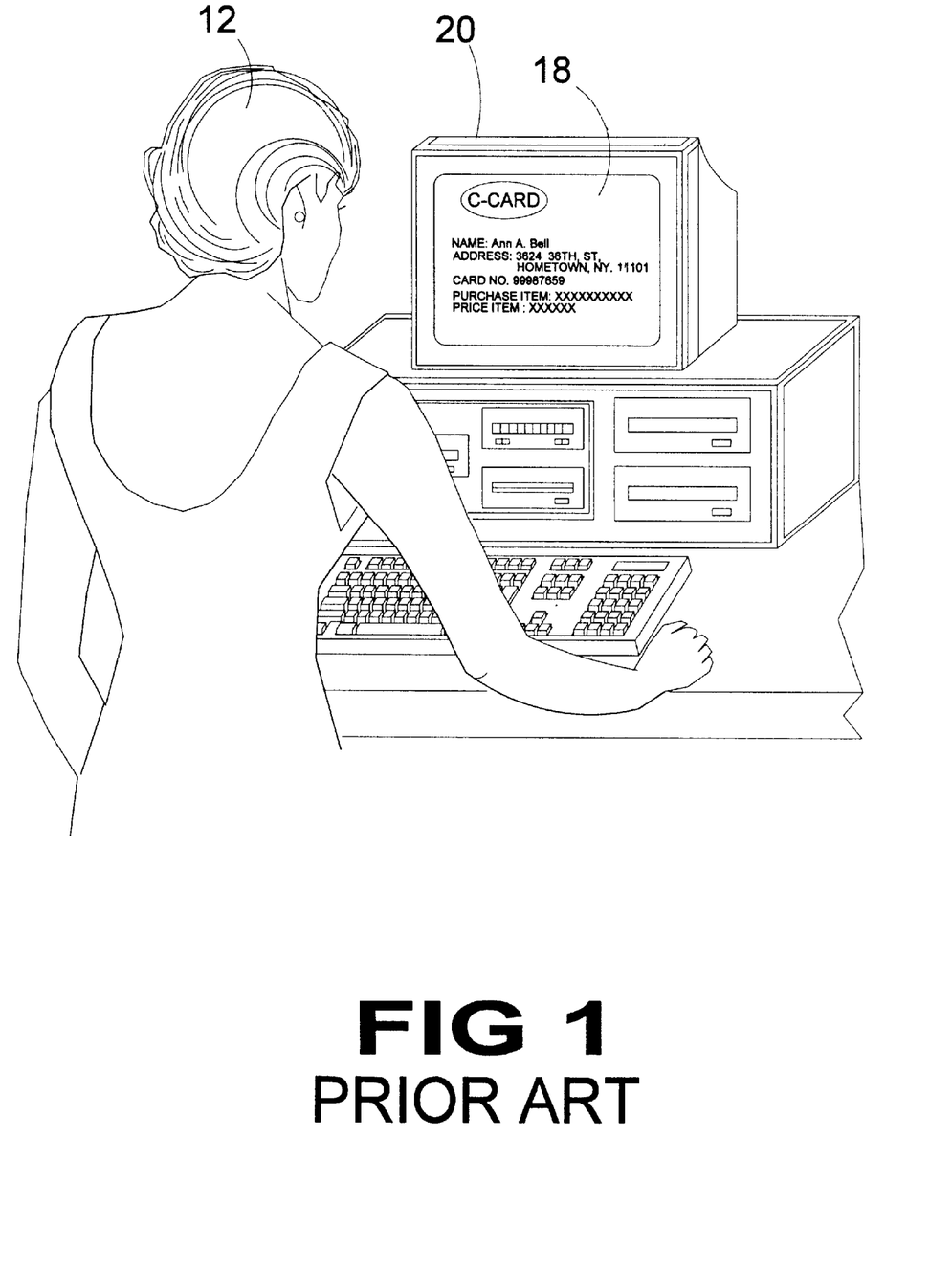
FIG. 1 is an illustration of prior art wherein an e-commerce user input credit card information.

Referring to FIG. 1 the prior art user (12) using their Internet system (20) signs onto an e-commerce site (18) and perform credit card transactions by inputting credit card information whereupon a service provider checks available credit.

Figure 2:
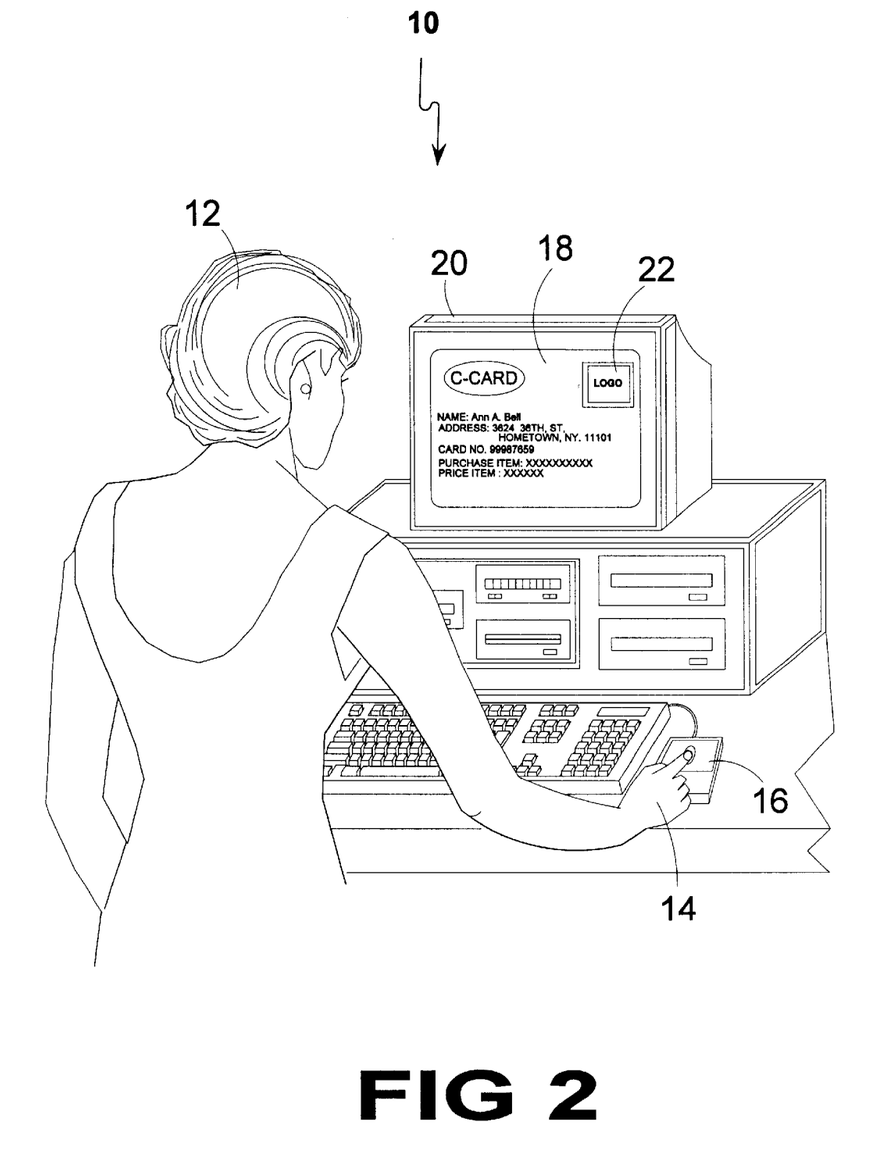
FIG. 2 is an illustration of the present invention wherein an e-commerce user inputs credit card information and one or more fingerprints using the biometric scanner.

Referring to FIG. 2, the Internet user (12) signs onto an e-commerce site (18) displaying the Touch Scan logo (22) using their Internet accessible system (20), whereupon after the user (12) inputs credit card information and initiates a fingerprint scan (16) of one or more digits (14) which is transmitted by the e-commerce site (24) to Touch Scan database for comparison to user (12) fingerprint data stored on Touch Scan database (30).

Figure 3:
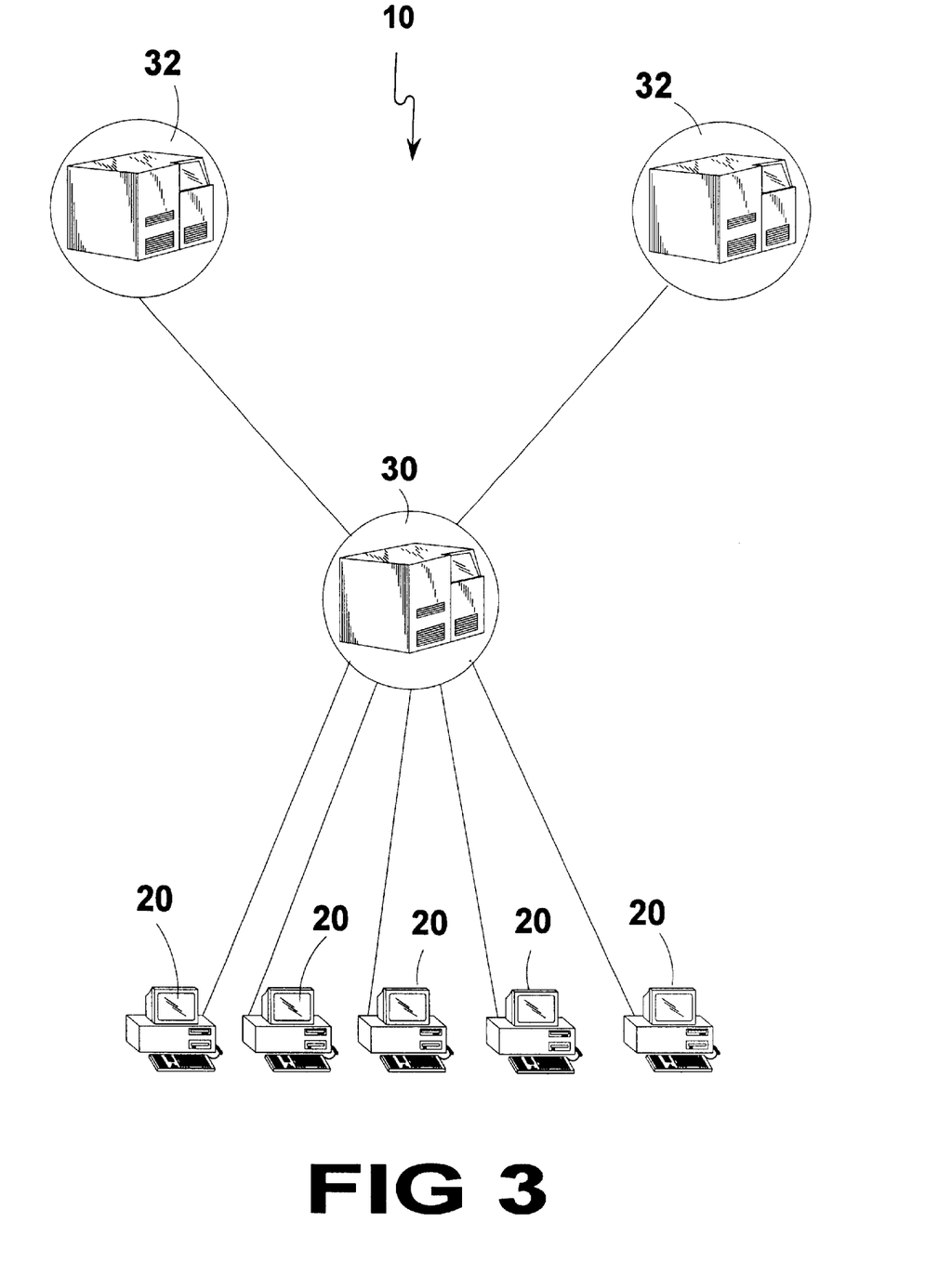
FIG. 3 is an illustrative view of the biometric credit card application process.

Referring to FIG. 3, the biometric credit card application process is initiated by a user (12) requesting said services from Touch Scan (30), Touch Scan (30) working in conjunction with one or more credit card providers (32) checks the applicants credit card worthiness and upon approval provides a credit card and stores the applicants fingerprints for future comparison.

Figure 4:
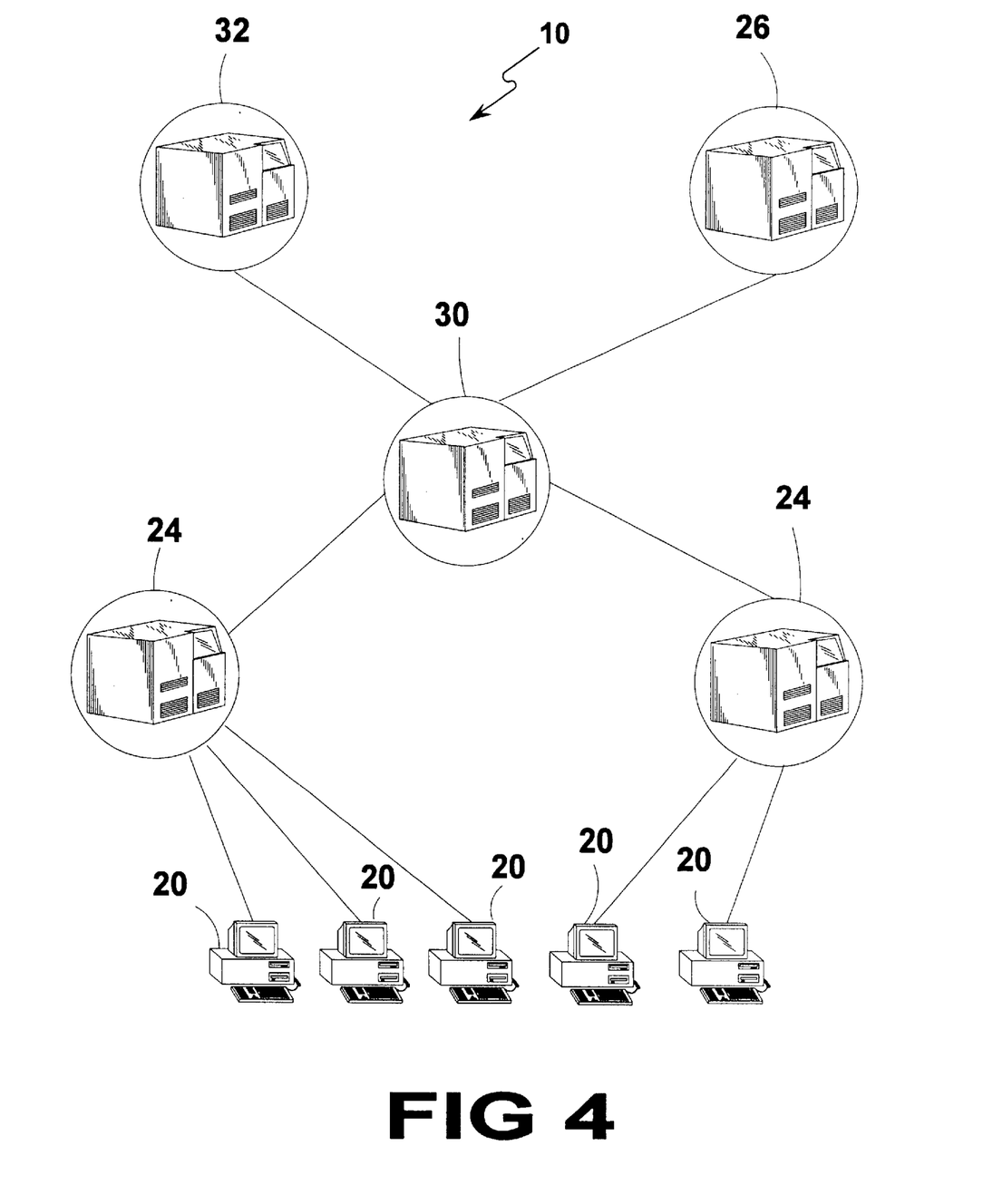
FIG. 4 is an illustrative view of the typical biometric credit card purchase using the present invention.

Referring to FIG. 4, the biometric credit card user (12) connects to an e-commerce site (24) displaying the Touch Scan logo, whereupon all credit card purchases are accompanied by a fingerprint scan of one or more of the user (12) which is submitted by the e-commerce site (24) to Touch Scan biometric credit card system (30) which compares the submitted fingerprint(s) (14) to the stored fingerprint data for the provided credit card number. After affirmative conformation that the card user (12) is authorized, Touch Scan (30) confirms available credit with either the credit card company (32) or a credit available service bureau (26).

Figure 5:
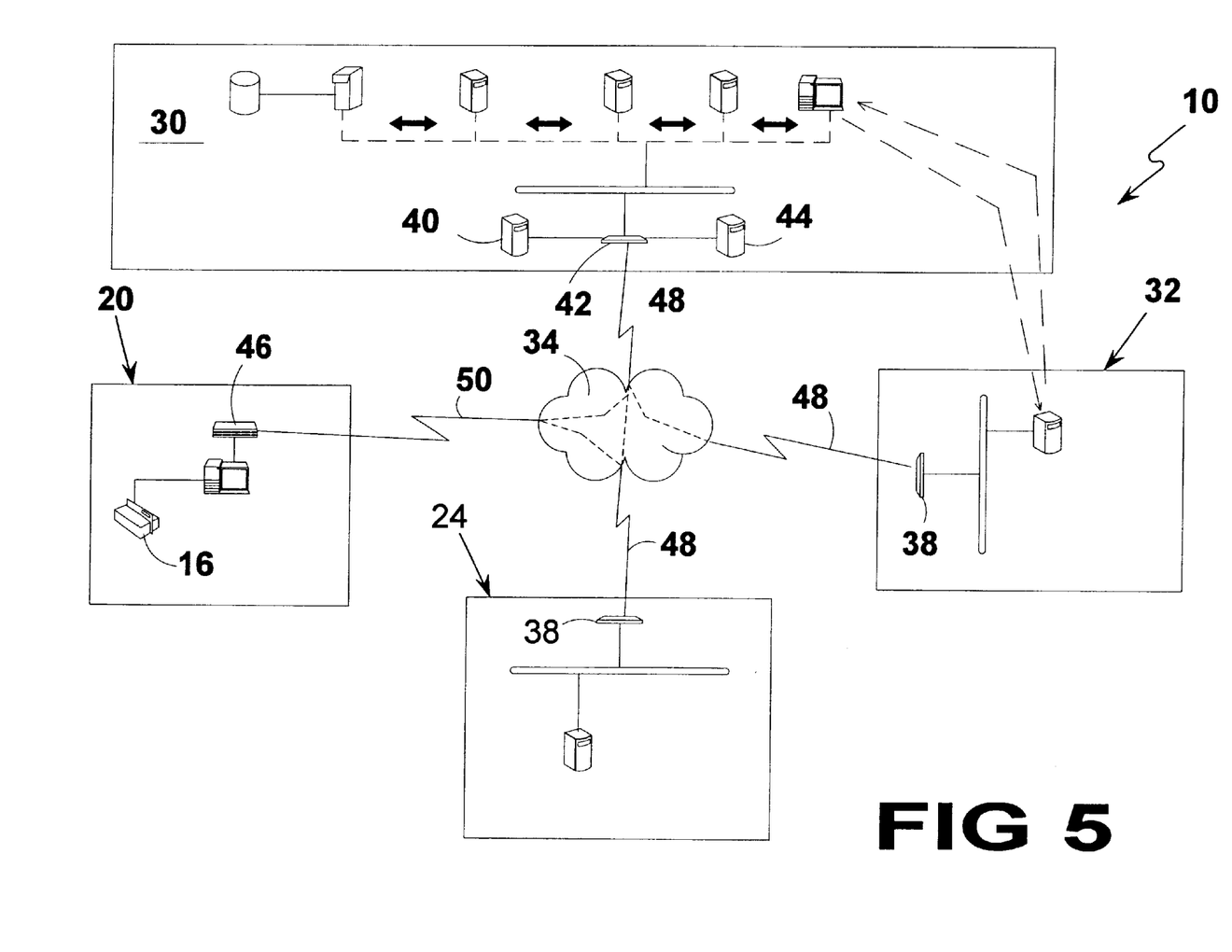
FIG. 5 is an illustrative view of one possible embodiment of the present invention.

Referring to FIG. 5, the Touch Scan biometric credit card identification verification services are initiated by an Internet user (12) request for purchases from an online/merchant (24) which may occur through the internet (34) using user owned internet access equipment (20). The user (12) establishes a secure connection (50) through a modem (46) with the online/vendor merchant (24) and transmits credit card information. Also, the user (12) scans their fingerprint(s) (14) using fingerprint scanner (16) and transmits the biometric information to the online/vendor merchant. The online/vendor merchant (24) having a router/firewall (38) establishes a secure connection (48) with Touch Scan (30). Touch Scan having a plurality of servers which are secured using router (42) DNS server (40) and DMZ firewall (44) accepts authorized queries of their identification verification system. Touch Scan (30) verifies use of a credit card by comparing submitted biometric information with biometric data previously supplied by the credit card holder. In addition to providing verification identification services for the online/vendor merchant, Touch Scan will verify, using a secure connection (48), the availibility of funds with the credit card provider (32). This information will be transmitted to the online/vendor merchant (24) by secure connection (48). The online/vendor merchant (24) will communicate by secure connection (50) with the e-commerce user as to the whether the transaction is approved or rejected.

Figure 6:
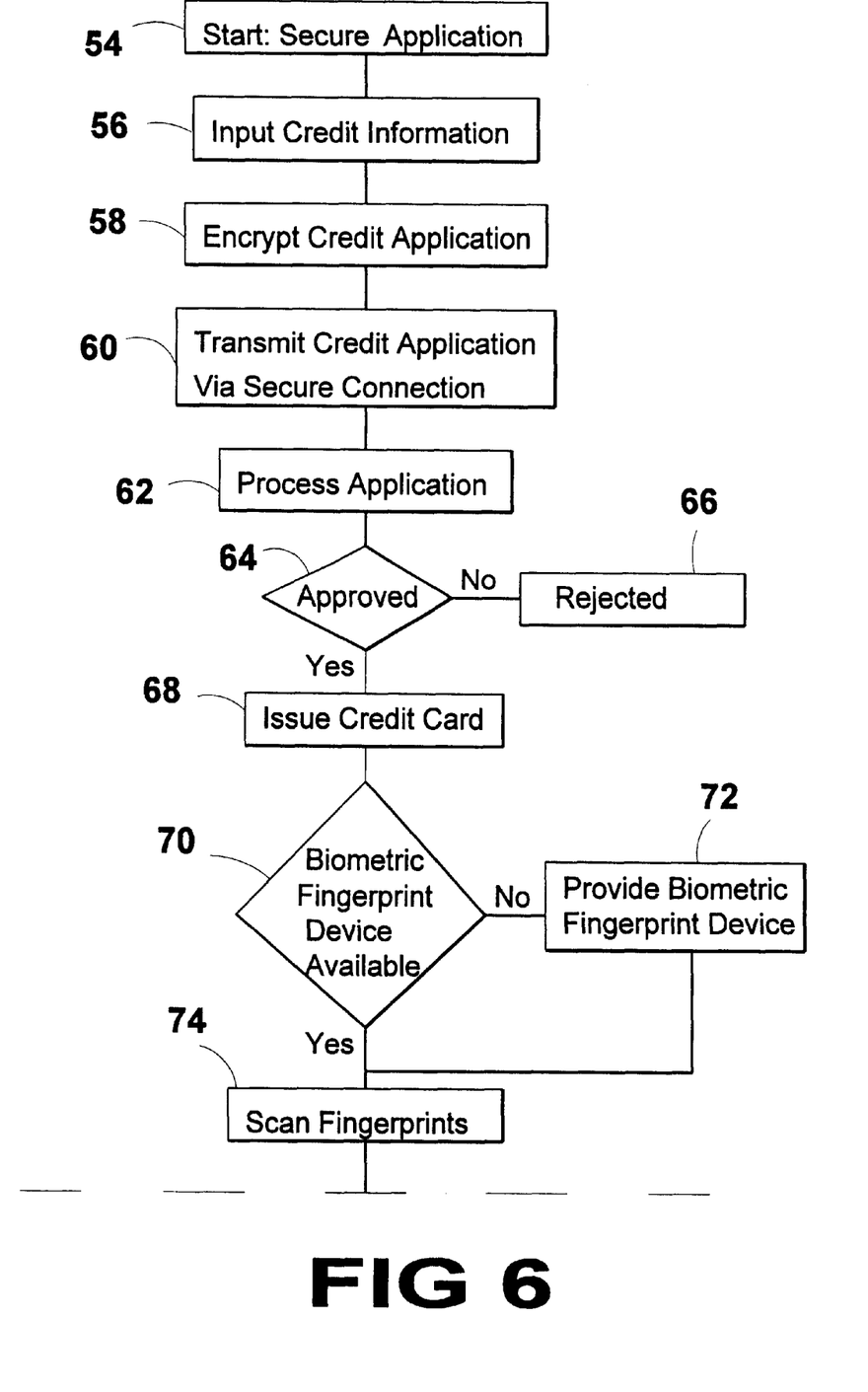
FIG. 6 is a flowchart of biometric credit card application process of the present invention.
Figure 7:
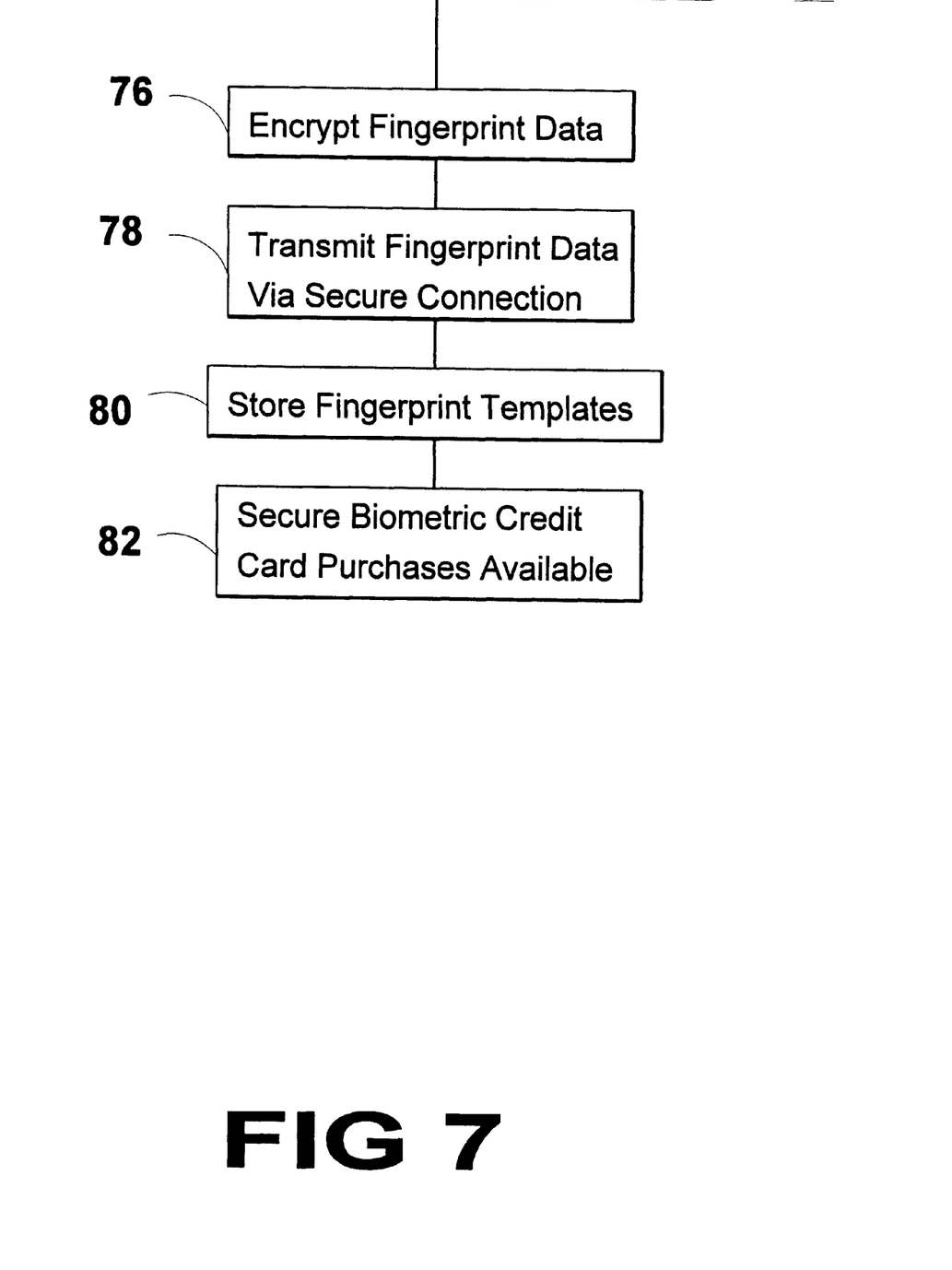
FIG. 7 is is a continuation of the flowchart shown in FIG. 6, of the biometric credit card application process of the present invention.

Referring to FIGS. 6 and 7, the Touch Scan biometric credit card services are initiated by an Internet user (12) request for services (40). The user fills out the credit card application (42). Using current available technology the application is encrypted (44) and transmitted by secure connection (46) to Touch Scan (30). Touch Scan (30) working in conjunction with a credit card provider (24) provides said credit card provider with the application for credit worthiness evaluation (62). If the applicant (12) does not meet the credit card providers standards the application is rejected (66).

If the application is approved (64) the credit card provider (32) issues the credit card (68). Touch Scan (30) determines whether the credit card user (12) has biometric scanning available (72) in their existing equipment. If the credit card user requires a biometric fingerprint scanning device, one is provided (70) by Touch Scan (30).

The credit card user (12) scans their fingerprint (74). The fingerprint data is encrypted (76) and transmitted by secure connection (78) to Touch Scan (30). Touch Scan (30) stores the users fingerprint data with the user's credit card data (80) for comparison with future fingerprint data supplied during credit card purchase transactions (82).

Figure 8:
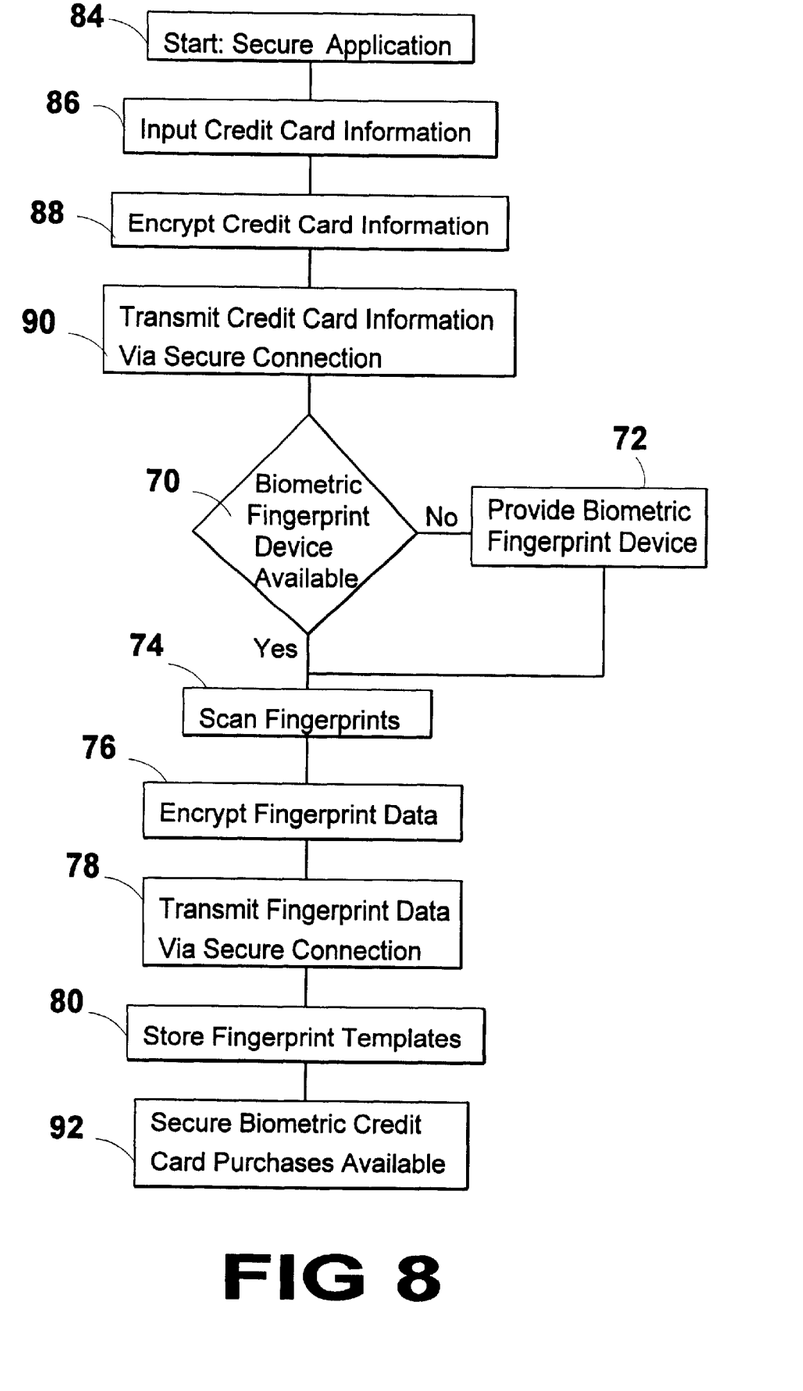
FIG. 8 is a flowchart of the application procedure for biometric credit card services for existing credit cards.

Referring to FIG. 8, the Touch Scan biometric services are initiated by an Internet user's (12) request for services (40) for their existing credit cards. The user supplies the credit card information (84). Using current available technology the information is encrypted (88) and transmitted by secure connection (90) to Touch Scan (30).

Touch Scan (30) determines whether the credit card user (12) has biometric scanning available (70) in their existing equipment. If the credit card user requires a biometric fingerprint scanning device, one is provided (72) by Touch Scan (30).

The credit card user (12) scans their fingerprint (74). The fingerprint data is encrypted (76) and transmitted by secure connection (78) to Touch Scan (30). Touch Scan (30) stores the users fingerprint data with the user's credit card data (80) for comparison with future fingerprint data supplied during credit card purchase transactions (92).

Figure 9:
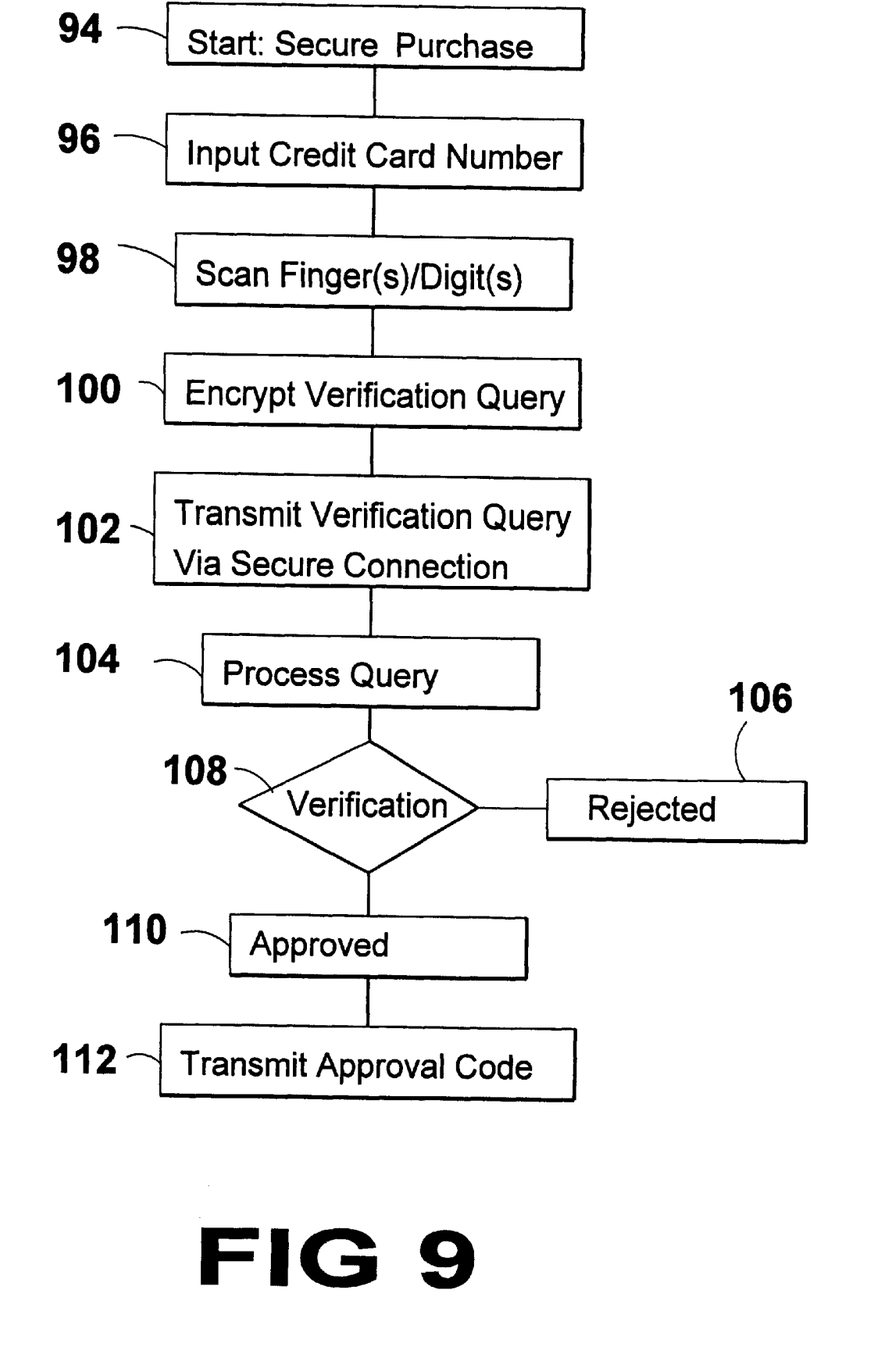
FIG. 9 is a flowchart of a purchase transaction between a biometric verification subscriber and an on-line vendor/merchant.

Referring to FIG. 9, the e-commerce user (12) initiates a purchase transaction(94) with an online vendor/merchant (24) by inputting credit card information (96). The user (12) also scans their fingerprints (98) which are encrypted (100) and transmits this information (102) to the online vendor/merchant (24). The online vendor/merchant (24) process the query (104) to verify that the credit card user is authorized and that funds are available. The online vendor/merchant (24) either rejects (106) or accepts the transaction (110) which is transmitted (112) to the user.

What is claimed is new and desired to be protected by Letters Patent is set forth in the appended claims:

1. A method of establishing a security system relying on biometric identification for facilitating credit/debit card services comprising the steps of:

a) an applicant fills out a credit card application and submits said application on line from applicant's own internet access equipment;

b) said credit card application is submitted to a third party working in conjunction with a credit card provider;

c) if the applicant meets credit card provider standards, the applicant is provided by the third party with a device for biometric scanning when the third party determines that applicant's existing equipment lacks biometric scanning equipment;

d) the applicant uses said device to produce biometric information which is encrypted and transmitted by secured connection to said third party; and e) said third party stores said biometric information along with the applicant's credit card data for comparison with future biometric data submitted during future credit card purchase transactions.

2. The method of claim 1 in which said biometric information is a fingerprint.

3. A method of establishing a security system relying on biometric identification for facilitating credit/debit card services comprising the steps of:

a) a third party establishes and maintains biometric and credit information about prospective purchasers of goods and services who voluntarily submit such information to said third party, said information being made available to one or more credit card providers;

b) a credit card provider contacts said third party for verification and approval whenever one of said prospective purchasers submits a credit card along with biometric information in connection with a purchase being made;

c) said third party provides to a prospective purchaser biometric scanning equipment when said third party determines that said prospective purchaser's existing equipment lacks biometric scanning equipment.

4. The method of claim 3 in which said biometric information is a fingerprint.

5. The method of claim 3 in which the prospective purchasers obtain credit/debit cards and make purchases while on line from their own internet access equipment.

* * * * *